2,857,412
PROCESS FOR OBTAINING FLUID LANOLIN

Wilfred R. Noble and John T. Scanlan, Philadelphia, and Abner Eisner, Glenside, Pa., assignors to the United States of America as represented by the Secretary of Agriculture No Drawing. Application August 27, 1957
Serial No. 680,609

2 Claims. (Cl. 260—426)

(Granted under Title 35, U. S. Code (1952), sec. 266)

A non-exclusive, irrevocable, royalty-free license in the invention herein described, throughout the world for all purposes of the United States Government with the power to grant sublicenses for such purposes, is hereby granted to the Government of the United States of America.

This invention relates to the production of fluid lanolin. More particularly, this invention relates to the fractionation of lanolin by means of urea-complex-forming techniques to produce a fluid lanolin which possesses good solubility in mineral oil.

Lanolin, also known as wool fat, refined wool fat, or refined wool grease, is used extensively in the manufacture of many types of products, particularly in the pharmaceutical and cosmetic industries. Lanolin is also used in making textile lubricants and rust-preventives. At ordinary room temperature, that is, about 25° C., lanolin is a soft, sticky and tacky substance, and the handling of it under these conditions is bothersome. Another disadvantage of lanolin is its low solubility in mineral oil, a desirable vehicle for many lanolin preparations. A mixture of 10% or more lanolin in mineral oil has a tendency to be cloudy, indicating incomplete solution.

The object of the present invention is to provide a lanolin which is fluid at ordinary room temperatures, which is miscible with mineral oil at the 25% level to give a clear solution, and whose constituent entities have not been chemically modified so that the fluid lanolin product possesses essentially all the desirable properties of the original lanolin.

According to the present invention lanolin or wool grease is mixed with urea and a suitable organic solvent such as methanol, and the mixture is concentrated and cooled. The resulting mixture is treated with a solvent, such as cold ether, in which the urea complex is insoluble, filtered or centrifuged, and the fluid lanolin fraction is recovered from the organic solvent solution.

Among the materials removed as urea complexes are straight chain aliphatic esters which are high melting waxes. These waxes impart much of the "tackiness" to lanolin and are relatively insoluble in mineral oil.

The following example is given in illustration, but not in limitation, of the process of the present invention.

EXAMPLE 1

Five hundred grams of U. S. P. grade lanolin (characteristics presented in Table I) were mixed with 1500 ml. of methanol and 480 grams of urea while being heated on the steam bath. Heating was continued until sufficient methanol had boiled off to leave the mixture a stiff paste. The mixture was then removed from the source of heat and stirred vigorously with a mechanical stirrer for 45 minutes. The mixture was cooled to 2° C. and kept at this temperature overnight. The mixture was then mixed with enough cold ether to form a thin slurry and filtered. The filter cake was washed with more cold ether. The ether filtrate and washings were combined, extracted with dilute hydrochloric acid to remove urea, and water washed until neutral. Upon evaporative distillation of the ether there was recovered a fluid lanoline product representing 71% of the original lanolin. Characteristics of the fluid lanolin are presented in Table I under fraction I.

The filter cake was extracted with ether in a Soxhlet apparatus for 24 hours. The Soxhlet extract, purified and recovered in a manner similar to that described for the fluid lanolin fraction, yielded a sticky semi-solid material amounting to 19% of the original lanolin. This product is designated as fraction II, in Table I.

The remaining filter cake, comprising the urea complexes, was heated in dilute hydrochloric acid to release the complex-forming material from the urea. The complex-forming material was extracted with ether and water washed until neutral. Upon evaporation of ether there was recovered 31 grams of a hard, white wax. This wax, representing 6% of the original lanolin, was called fraction III.

In this particular example, 4% of the original lanolin was lost in handling.

Table I

[Analysis of lanolin (U. S. P. grade) and its fractionation products obtained by urea-complex-forming technique.]

| Characteristics | Original Lanolin | Fluid Lanolin (I) | Fraction II | White Wax (III) |
|---|---|---|---|---|
| Acid No. | 1.3 | 1.2 | 1.3 | 8.5 |
| Sap. No. | 95.6 | 95.5 | 85.5 | 85.8 |
| Hydroxyl (Percent) | 1.32 | 0.78 | 1.18 | 2.66 |
| Cholesterol (Percent) | 19.4 | 19.3 | 21.5 | 1.11 |
| Lanosterol (Percent) | 13.3 | 15.3 | 11.4 | 0.2 |

Inspection of the data in Table I reveals that the chemical properties of the fluid lanolin fraction are quite similar to those of the original lanolin. The only significant differences are a decrease in percent hydroxyl and an increase in percent lanosterol. Fraction III contains mostly straight chain hydroxy esters which accounts for its high hydroxyl content and explains the lower hydroxyl content of fraction I. The variation of lanosterol-cholesterol ratio of fraction I is attributed to the higher proportion of cholesterol to lanosterol present in fraction II.

An outstanding property of the major fraction is that it is now a liquid. Measurements with two different Fenske modified Ostwald viscosimeters gave values of 321 and 325 stokes at 25.0 C. These visocity values are given only in illustration that a fluid lanolin product has been prepared, as no comparison can be made with the original lanolin which is a solid at this temperature. As a fluid material the lanolin product of this invention may be measured and otherwise handled with much greater facility than solid lanolin.

The fluid lanolin fraction has greatly improved miscibility with mineral oil as compared with the original lanolin. Whereas a mixture of 10% lanolin (U. S. P. grade) with mineral oil was a cloudy product from which solids would settle out on standing, up to 25% of the fluid lanolin of Example 1 can be dissolved in mineral oil to give a perfectly clear solution at room temperature.

Products of this process other than the fluid lanolin faction will depend upon whether an intermediate fraction (fraction II of Example 1) is desired for a particular use or for recycling purposes or whether it is desired to recover this fraction combined with the hard, white wax (fraction III).

Although the process of this invention has been described as applied to refined wool grease, the process has also been successfully employed to fractionate commercial wool grease, as, for example, a wool grease as recovered by centrifugation of aqueous wool scouring liquors.

In an alternative process the fractionation based upon urea complex formation can be performed upon any wool grease and the fluid product subsequently bleached and deodorized to obtain the desired fluid lanolin. This procedure is especially advantageous with wool greases, such as solvent recovered wool grease or acid cracked wool grease, which contain a high percentage of free acids. The free acids will also form urea complexes and hence be removed in the process.

In the production of the complexes, that is, when lanolin is treated with urea and methanol, the solution of any one component in any other is only partial and the result is a physical mixture in the form of a stiff paste. Stirring the stiff paste mixture is considered important in order to insure intimate contact between urea and the lanolin components which form a complex with the urea. Since the phenomena is primarily a matter of contact rather than rate of reaction, the length of time of stirring may be varied depending upon the consistency of the paste and the efficiency of the equipment performing the mixing, and the time specified in the example was arbitrarily selected.

Methanol is the preferred solvent for preparing urea complexes and was satisfactory for this purpose in the present process.

The presence of moisture, in the amount present in commerical wool greases, will not affect urea complex formation.

As an alternative procedure for making the urea complexes, one can add, with stirring, just enough methanol to the urea-lanolin mixture to give the proper consistency instead of using relatively larger amounts of methanol and evaporating the excess. In this instance even more thorough mixing than described in Example 1 is recommended.

As demonstrated in the example, fraction III was obtained from material which was insoluble in warm ether. Hence, the low temperature conditions described for storage of the lanolin-urea mixture (2° C.) and for the subsequent ether extraction are not necessarily essential for operation of the process, but conducting these steps of the process at temperatures of 10° C. or below assures consistent production of the desired fluid lanolin, that is, fluid lanolin which is completely miscible at a 25% concentration in mineral oil at room temperatures.

Although hydrochloric acid was employed in the described procedures where free or bound urea was removed from the varsious lanolin fractions, any mineral acid may be substituted for hydrochloric acid for this purpose.

We claim:

1. A process for obtaining a fluid lanolin fraction from lanolin, said process comprising mixing together and stirring lanolin and urea with enough methanol to form a pasty mixture, continuing the stirring of said mixture until urea-complex formation is substantially complete, slurrying said mixture in cold ether, removing ether insolubles from the ether solution, extracting said solution with dilute aqueous mineral acid to remove urea, water washing the acidic ether solution until neutral, and recovering said fluid lanolin from the washed ether solution.

2. A process for obtaining a fluid lanolin fraction from lanolin, said process comprising mixing together lanolin, urea and methanol under conditions of mild heat, concentrating the resulting mixture, to the consistency of a stiff paste, cooling and stirring said mixture until urea-complex-formation is substantially complete, slurrying said mixture in cold ether, removing ether insolubles from the ether solution, extracting said solution with dilute aqueous mineral acid to remove urea, water washing the acidic ether solution until neutral, and recovering said fluid lanolin from the washed ether solution.

References Cited in the file of this patent
UNITED STATES PATENTS
2,758,125  Sunde ------------------ Aug. 7, 1956